US009016873B2

(12) United States Patent
DeCusatis

(10) Patent No.: US 9,016,873 B2
(45) Date of Patent: *Apr. 28, 2015

(54) THREE DIMENSIONAL IMAGE PROJECTOR STABILIZATION CIRCUIT

(71) Applicant: International Business Machines Corporation, Armonk, NY (US)

(72) Inventor: Casimer M. DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/062,920

(22) Filed: Oct. 25, 2013

(65) Prior Publication Data
US 2014/0049754 A1 Feb. 20, 2014

Related U.S. Application Data

(63) Continuation of application No. 13/357,725, filed on Jan. 25, 2012.

(51) Int. Cl.
*G03B 21/28* (2006.01)
*G03B 21/20* (2006.01)
(Continued)

(52) U.S. Cl.
CPC ............ *G03B 21/2073* (2013.01); *G03B 35/16* (2013.01); *G03B 35/26* (2013.01); *H04N 13/0434* (2013.01); *H04N 13/0459* (2013.01)

(58) Field of Classification Search
USPC ...................... 353/20, 30, 31, 122, 85, 94, 99; 372/29.011, 29.015, 30; 348/744–747, 348/769, E9.026; 315/368.15, 368.18, 370, 315/371
See application file for complete search history.

(56) References Cited

U.S. PATENT DOCUMENTS 4,630,097 A 12/1986 Marks
4,870,486 A 9/1989 Nakagawa et al.
(Continued)

FOREIGN PATENT DOCUMENTS

CN 1624525 A 6/2005
CN 1666269 A 9/2005
(Continued)

OTHER PUBLICATIONS

U.S. Appl. No. 13/357,719; Final Office Action; Date Filed: Jan. 25, 2012; Date Mailed: Jan. 27, 2014; pp. 1-37.
(Continued)

*Primary Examiner* — Sultan Chowdhury
(74) *Attorney, Agent, or Firm* — Cantor Colburn LLP; Steven Chiu

(57) ABSTRACT

A method for providing a feedback circuit for a three dimensional projector. First and second input devices and a sensor for determining the rotational speed of the second input device are provided. A control device for controlling the rotational speed of the second input device and a phase locked loop (PLL) are provided. A phase reference signal is created based on the signal rate of the first input device. A phase signal is created based on the rotational speed of the second input device. The PLL compares the phase reference signal and the phase feedback signal to determine whether the first input device and the second input device are synchronized. A signal is sent to the control device for the second input device to change the rotational speed of the second input device in response to determining that the first input device and the second input device are not synchronized.

20 Claims, 5 Drawing Sheets

(51) Int. Cl.
*G03B 35/16* (2006.01)
*G03B 35/26* (2006.01)
*H04N 13/04* (2006.01)

(56) References Cited

U.S. PATENT DOCUMENTS

| | | | |
|---|---|---|---|
| 5,113,285 | A | 5/1992 | Franklin et al. |
| 5,142,366 | A * | 8/1992 | Brown et al. ............... 348/704 |
| 5,168,199 | A * | 12/1992 | Huffman et al. ............. 315/370 |
| 5,420,484 | A * | 5/1995 | Morrish ........................ 315/408 |
| 5,751,479 | A | 5/1998 | Hamagishi et al. |
| 6,040,946 | A | 3/2000 | Hebert |
| 6,327,093 | B1 | 12/2001 | Nakanishi et al. |
| 6,344,927 | B1 | 2/2002 | Itoh et al. |
| 6,359,664 | B1 | 3/2002 | Faris |
| 6,672,722 | B2 | 1/2004 | O'Connor et al. |
| 6,704,065 | B1 | 3/2004 | Sharp et al. |
| 6,813,085 | B2 | 11/2004 | Richards |
| 7,081,997 | B2 | 7/2006 | Sedlmayr |
| 7,119,957 | B2 | 10/2006 | Itoh et al. |
| 7,270,428 | B2 | 9/2007 | Alasaarela et al. |
| 7,283,308 | B2 | 10/2007 | Cossairt et al. |
| 7,401,923 | B2 | 7/2008 | Fergason |
| 7,446,733 | B1 | 11/2008 | Hirimai |
| 7,468,844 | B2 | 12/2008 | Hall, Jr. |
| 7,477,220 | B2 | 1/2009 | Muto |
| 7,561,322 | B1 | 7/2009 | Maeda et al. |
| 7,649,915 | B2 | 1/2010 | Fermann et al. |
| 7,692,605 | B2 | 4/2010 | Tsao |
| 7,766,490 | B2 | 8/2010 | Harbers et al. |
| 7,773,160 | B2 | 8/2010 | Yamazaki et al. |
| 7,848,370 | B2 | 12/2010 | Kewitsch et al. |
| 8,337,020 | B2 | 12/2012 | Handschy et al. |
| 8,388,138 | B1 | 3/2013 | Boothroyd |
| 2002/0191235 | A1 | 12/2002 | O'Connor et al. |
| 2003/0179791 | A1* | 9/2003 | Hiroshi et al. ........... 372/29.011 |
| 2004/0109329 | A1 | 6/2004 | Kato |
| 2004/0155207 | A1 | 8/2004 | Kleinschmidt |
| 2004/0201879 | A1 | 10/2004 | Shih et al. |
| 2004/0207879 | A1 | 10/2004 | Bailey et al. |
| 2006/0187393 | A1 | 8/2006 | Kuan et al. |
| 2006/0232845 | A1 | 10/2006 | Harned et al. |
| 2006/0238716 | A1 | 10/2006 | Lee et al. |
| 2006/0279662 | A1 | 12/2006 | Kapellner et al. |
| 2006/0290889 | A1 | 12/2006 | Robinson et al. |
| 2007/0035830 | A1 | 2/2007 | Matveev et al. |
| 2007/0115230 | A1 | 5/2007 | Tajiri et al. |
| 2007/0139519 | A1 | 6/2007 | DeCusatis et al. |
| 2007/0139618 | A1 | 6/2007 | DeCusatis et al. |
| 2007/0139769 | A1 | 6/2007 | DeCusatis et al. |
| 2007/0146880 | A1 | 6/2007 | Bleha et al. |
| 2007/0181834 | A1 | 8/2007 | Kleinschmidt |
| 2007/0188863 | A1 | 8/2007 | Sun et al. |
| 2007/0195408 | A1 | 8/2007 | Divelbiss et al. |
| 2008/0018999 | A1 | 1/2008 | Schuck et al. |
| 2008/0043295 | A1* | 2/2008 | Sakakibara ................ 358/474 |
| 2008/0055550 | A1 | 3/2008 | Kim |
| 2008/0094577 | A1 | 4/2008 | Krijn et al. |
| 2008/0151193 | A1 | 6/2008 | Reder |
| 2009/0040463 | A1 | 2/2009 | Chen et al. |
| 2009/0086016 | A1 | 4/2009 | Su |
| 2009/0141242 | A1 | 6/2009 | Silverstein et al. |
| 2009/0180181 | A1 | 7/2009 | Oakley |
| 2009/0207379 | A1 | 8/2009 | Oakley |
| 2009/0231549 | A1 | 9/2009 | Chen et al. |
| 2009/0310042 | A1 | 12/2009 | Vidal et al. |
| 2010/0039624 | A1 | 2/2010 | Fujinawa et al. |
| 2010/0045938 | A1 | 2/2010 | Lin et al. |
| 2010/0110386 | A1 | 5/2010 | Handschy et al. |
| 2010/0118276 | A1 | 5/2010 | Li |
| 2010/0141856 | A1 | 6/2010 | Schuck et al. |
| 2010/0171909 | A1 | 7/2010 | Handschy |
| 2010/0189344 | A1 | 7/2010 | Maes |
| 2010/0208210 | A1 | 8/2010 | Aastuen et al. |
| 2010/0238413 | A1 | 9/2010 | Huang |
| 2010/0253769 | A1 | 10/2010 | Coppeta et al. |
| 2010/0272138 | A1* | 10/2010 | Chiba et al. ........................ 372/30 |
| 2011/0089315 | A1 | 4/2011 | Walt et al. |
| 2011/0116051 | A1 | 5/2011 | Young et al. |
| 2011/0149253 | A1 | 6/2011 | Mihashi et al. |
| 2011/0204793 | A1 | 8/2011 | Gardner, Jr. |
| 2011/0211168 | A1 | 9/2011 | Kim et al. |
| 2011/0273539 | A1 | 11/2011 | Yoon et al. |
| 2012/0019529 | A1 | 1/2012 | Kimpe |
| 2012/0287144 | A1 | 11/2012 | Gandhi et al. |
| 2012/0307211 | A1 | 12/2012 | Hofmann et al. |
| 2013/0077283 | A1 | 3/2013 | Li |
| 2013/0082994 | A1 | 4/2013 | Al-Dahle |
| 2013/0147393 | A1 | 6/2013 | Bazzani et al. |

FOREIGN PATENT DOCUMENTS

| | | |
|---|---|---|
| CN | 1721961 A | 1/2006 |
| CN | 1854810 A | 11/2006 |
| CN | 1885096 A | 12/2006 |
| CN | 1987552 A | 6/2007 |
| CN | 101196615 A | 6/2008 |
| CN | 101364037 A | 2/2009 |
| CN | 101373054 A | 2/2009 |
| CN | 101482665 A | 7/2009 |
| CN | 101571631 A | 11/2009 |
| CN | 101625467 A | 1/2010 |
| CN | 101770150 A | 7/2010 |
| CN | 201576164 U | 9/2010 |
| CN | 102043254 A | 5/2011 |
| CN | 102089701 A | 6/2011 |
| CN | 102193239 A | 9/2011 |
| CN | 202057900 U | 11/2011 |
| CN | 102289141 A | 12/2011 |
| CN | 102300108 A | 12/2011 |
| JP | 2000284223 A | 10/2000 |
| JP | 2001222064 A | 8/2001 |
| JP | 2007065408 A | 3/2007 |
| JP | 2008064809 A | 3/2008 |
| WO | 9952269 | 10/1999 |
| WO | 2005032150 A1 | 4/2005 |
| WO | 2008042615 A1 | 4/2008 |
| WO | 2010143891 A2 | 12/2010 |

OTHER PUBLICATIONS

U.S. Appl. No. 13/673,462; Non-Final Office Action; Date Filed: Nov. 9, 2012; Date Mailed: Jan. 30, 2014; pp. 1-53.
U.S. Appl. No. 13/357,737; Notice of Allowance; Date Filed: Jan. 25, 2012; Date Mailed: Jan. 13, 2014; pp. 1-17.
U.S. Appl. No. 13/357,725; Notice of Allowance; Date Filed: Jan. 25, 2012; Date Mailed: Jan. 17, 2014; pp. 1-16.
U.S. Appl. No. 13/672,980; Non Final Office Action; Date Filed: Nov. 9, 2012; Date Mailed: Nov. 8, 2013; pp. 1-41.
U.S. Appl. No. 13/357,737; Notice of Allowance; Date Filed: Jan. 25, 2012; Date Mailed: Nov. 22, 2013; pp. 1-56.
U.S. Appl. No. 13/672,947; Non Final Office Action; Date Filed: Nov. 9, 2012; Date Mailed: Nov. 26, 2013; pp. 1-40.
Chen et al.; "Simple Multimode Stereoscopic Liquid Crystal Display"; Japanese Journal of Applied Physics; Part 2 (Letters); vol. 36; No. 12B; pp. L1685-8; Dec. 15, 1997.
Fergason et al.; An innovative beamsplitter-based stereoscopic/3D display design, Proceedings of SPIE—The International Society for Optical Engineering; vol. 5664; No. 1; pp. 488-494; Mar. 22, 2005.
International Application No. PCT/CN2013/070865; International Search Report and Written Opinion dated May 2, 2013, 14 pages.
International Application No. PCT/CN2013/070883; International Search Report and Written Opinion dated May 2, 2013, 12 pages.
International Application No. PCT/CN2013/070831; International Search Report and Written Opinion dated May 9, 2013, 11 pages.
International Application No. PCT/CN2013/070888; International Search Report and Written Opinion dated May 2, 2013, 11 pages.
U.S. Appl. No. 13/672,877; Non Final Office Action; Date Filed: Nov. 9, 2012; Date Mailed: Oct. 3, 2013; pp. 1-24.
U.S. Appl. No. 13/357,704; Non Final Office Action; Date Filed: Jan. 25, 2012; Date Mailed: Jul. 15, 2013; pp. 1-24.

(56) References Cited

OTHER PUBLICATIONS

U.S. Appl. No. 13/357,719; Non Final Office Action; Date Filed: Jan. 25, 2012; Date Mailed: Jul. 26, 2013; pp. 1-33.
International Application No. PCT/CN2013/070828; International Search Report and Written Opinion dated Apr. 25, 2013, 13 pages.
Pezzaniti et al.; "Flat Panel 3D Display for Unmanned Ground Vehicles"; Proceedings of SPIE—The International Society for Optical Engineering; vol. 7332; pp. 73320N, 2009.
U.S. Appl. No. 13/673,112; Non Final Office Action; Date Filed: Nov. 9, 2012; Date Mailed: Dec. 13, 2013; pp. 1-42.
U.S. Appl. No. 13/357,725; Notice of Allowance; Date Filed: Jan. 25, 2012; Date Mailed: Nov. 20, 2013; pp. 1-33.
U.S. Appl. No. 13/651,780; Notice of Allowance; Date Filed: Oct. 15, 2012; Date Mailed: Dec. 23, 2013 pp. 1-21.
U.S. Appl. No. 13/357,704; Final Office Action; Date Filed: Jan. 25, 2012; Date Mailed: Oct. 30, 2013; pp. 1-23.
U.S. Appl. No. 13/357,725; Non Final Office Action; Date Filed: Jan. 25, 2012; Date Mailed: Jul. 15, 2013; pp. 1-28.
U.S. Appl. No. 13/357,707; Non Final Office Action; Date Filed: Jan. 25, 2012; Date Mailed: Feb. 4, 2014; pp. 1-56.
U.S. Appl. No. 13/357,715; Non Final Office Action; Date Filed: Jan. 25, 2012; Date Mailed: Feb. 26, 2014; pp. 1-40.
U.S. Appl. No. 13/651,715; Non Final Office Action; Date Filed: Oct. 15, 2012; Date Mailed: Feb. 5, 2014; pp. 1-52.
U.S. Appl. No. 13/651,780; Notice of Allowance; Date Filed: Oct. 15, 2012; Date Mailed: Feb. 28, 2014, pp. 1-14.
U.S. Appl. No. 13/672,877; Final Office Action; Date Filed: Nov. 9, 2012; Date Mailed: Mar. 26, 2014; pp. 1-18.
International Search Report for International Application No. PCT/CN2013/076777; Date Mailed: Mar. 13, 2014, 11 pages.
U.S. Appl. No. 13/357,767; Non Final Office Action; Date Filed: Jan. 25, 2012; Date Mailed: Mar. 10, 2014; pp. 1-37.
U.S. Appl. No. 13/357,704; Non-Final Office Action; Date Filed: Jan. 25, 2012; Date Mailed: Mar. 18, 2014; pp. 1-36.
U.S. Appl. No. 13/357,725; Non-Final Office Action; Date Filed: Jan. 25, 2012; Mailing Date: Mar. 21, 2014; pp. 1-14.
U.S. Appl. No. 13/672,980; Notice of Allowance; Date Filed: Nov. 9, 2012; Date Mailed: Mar. 26, 2014; pp. 1-17.
U.S. Appl. No. 13/673,112; Notice of Allowance; Date Filed: Nov. 9, 2012; Date Mailed: Apr. 30, 2014; pp. 1-24.
U.S. Appl. No. 13/672,947; Notice of Allownce; Date Filed: Nov. 9, 2012; Date Mailed: Apr. 30, 2014; pp. 1-23.
U.S. Appl. No. 13/357,707; Final Office Action; Date Filed: Jan. 25, 2012; Date Mailed: Jun. 12, 2014; pp. 1-22.
U.S. Appl. No. 13/357,719; Final Office Action; Date Filed: Jan. 25, 2012; Date Mailed: Jun. 19, 2014; pp. 1-44.
U.S. Appl. No. 14/051,477; Non-Final Office Action; Date Filed: Oct. 11, 2013; Date Mailed Jun. 20, 2014; 31 pages.
U.S. Appl. No. 13/672,877; Notice of Allowance; Date Filed: Nov. 9, 2012; Date Mailed: Jun. 25, 2014, pp 1-11.
U.S. Appl. No. 13/673,462; Final Office Action; Date Filed: Nov. 9, 2012; Date Mailed: Jun. 12, 2014; 19 pages.

* cited by examiner

THREE DIMENSIONAL IMAGE PROJECTOR STABILIZATION CIRCUIT

CROSS-REFERENCE TO RELATED APPLICATION

This application is a continuation of U.S. patent application Ser. No. 13/357,725, filed Jan. 25, 2012, the content of which is hereby incorporated by reference in its entirety.

BACKGROUND

The present invention relates to a stereoscopic three dimensional image projector, and more specifically, to a feedback circuit for a three dimensional projector.

Three dimensional (3D) movies and pictures have become a popular form of entertainment due to the increased realism of the images. 3D images utilize the human physical trait of binocular vision. Human eyes are spaced about 2 inches (5 centimeters) apart; therefore each eye sees the world from a slightly different perspective. The brain receives both images and has a binocular vision function that correlates the difference between what each eye sees to determine distance. The determination of the distance provides the 3D effect that a person sees.

To create a binocular image on a two dimensional surface (2D), such as a movie or television screen, the user typically wears glasses. The glasses alter the way that the user views the images to create the simulated 3D effect. Typically there are two types of glasses, passive glasses and active glasses. The type of glasses used will depend on the type of image projection system being used.

Passive glasses rely upon an optical effect created by using different lenses for each eye. The projection system emits a sequential series of images where subsequent images are slightly offset. The images are arranged such that the user sees the first image through a first lens of the glasses (e.g. the right eye) and the second image is seen with the other lens (e.g. the left eye). Since the images are projected quickly, the user does not notice the multiple images, but rather sees a three dimensional effect. With active lenses, the glasses wirelessly communicate with the projector to synchronize the operation of the glasses with the images being displayed. With active glasses, the lenses are typically liquid crystal displays (LCDs) that can switch between transmitting light and blocking light. In this way, the glasses may rapidly switch the left and right lenses between clear and opaque. While the glasses are switching, the television is projecting a series of sequential images. When this switching is synchronized between the television and the glasses, the user experiences a three dimensional effect.

In 3D projectors using both active and passive lenses, synchronization of the images is critical to the functionality of the projector. Because the multiple images projected typically have different polarizations, it is imperative that the light source, imaging device, and polarization modulator within the projector remain synchronized. If these devices are not properly synchronized, the images will not be correctly polarized to create the 3D effect.

BRIEF SUMMARY

An embodiment is a method that includes providing a first input device, a second input device, and a sensor for determining the rotational speed of the second input device. The method also includes providing a control device for controlling the rotational speed of the second input device. The method further includes providing a phased locked loop (PLL) and creating a phase reference signal based on the signal rate of the first input device. A phase signal is created based on the rotational speed of the second input device as it is measured by the sensor. The PLL compares the phase reference signal and the phase feedback signal to determine whether the first input device and the second input device are synchronized. A signal is sent to the control device for the second input device to change the rotational speed of the second input device in response to determining that the first input device and the second input device are not synchronized.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An embodiment of the present invention includes an electronic feedback circuit for synchronizing polarization modulation elements with flashing light sources or data modulation devices in stereoscopic three dimensional (3D) pico projectors. In an embodiment, a 3D stereo input signal (such as from an electronic stereo jack or similar system) is derived from the frame rate of a digital image system and used as a phase reference to synchronize the input signal with a polarization modulator. In other embodiments, the same approach is used to synchronize various elements within a pico projector, including elements such as the frame rate of the signal driving the image system (a liquid crystal on silicon display or "LCoS display", a digital mirror device or "DMD", or a similar device), a rotating polarization modulator, a flashing light emitting diode (LED) or laser light source, or multiple light sources with a common dichroic combiner.

One of the two devices to be synchronized provides the stereo jack input, and the other provides a signal from a modulation sensor (for example, a tachometer measurement of the rotating polarization element, or a fraction of the modulation signal driving the LED or LCoS device). In an embodiment, a modulation sensor input is delayed by some amount due to variations in the circuitry layout for different pico projector designs. To compensate for this delay, embodiments incorporate a variable quiescence delay that cancels out the delay in order to achieve the necessary synchronization accuracy. In an embodiment, the feedback from the modulation sensor is amplified and conditioned prior to driving a phase locked loop (PLL) which also uses the phase reference signal (divided by 2) to account for the fact that the signal must be modulated at twice the speed of the polarization element.

Figure 1:
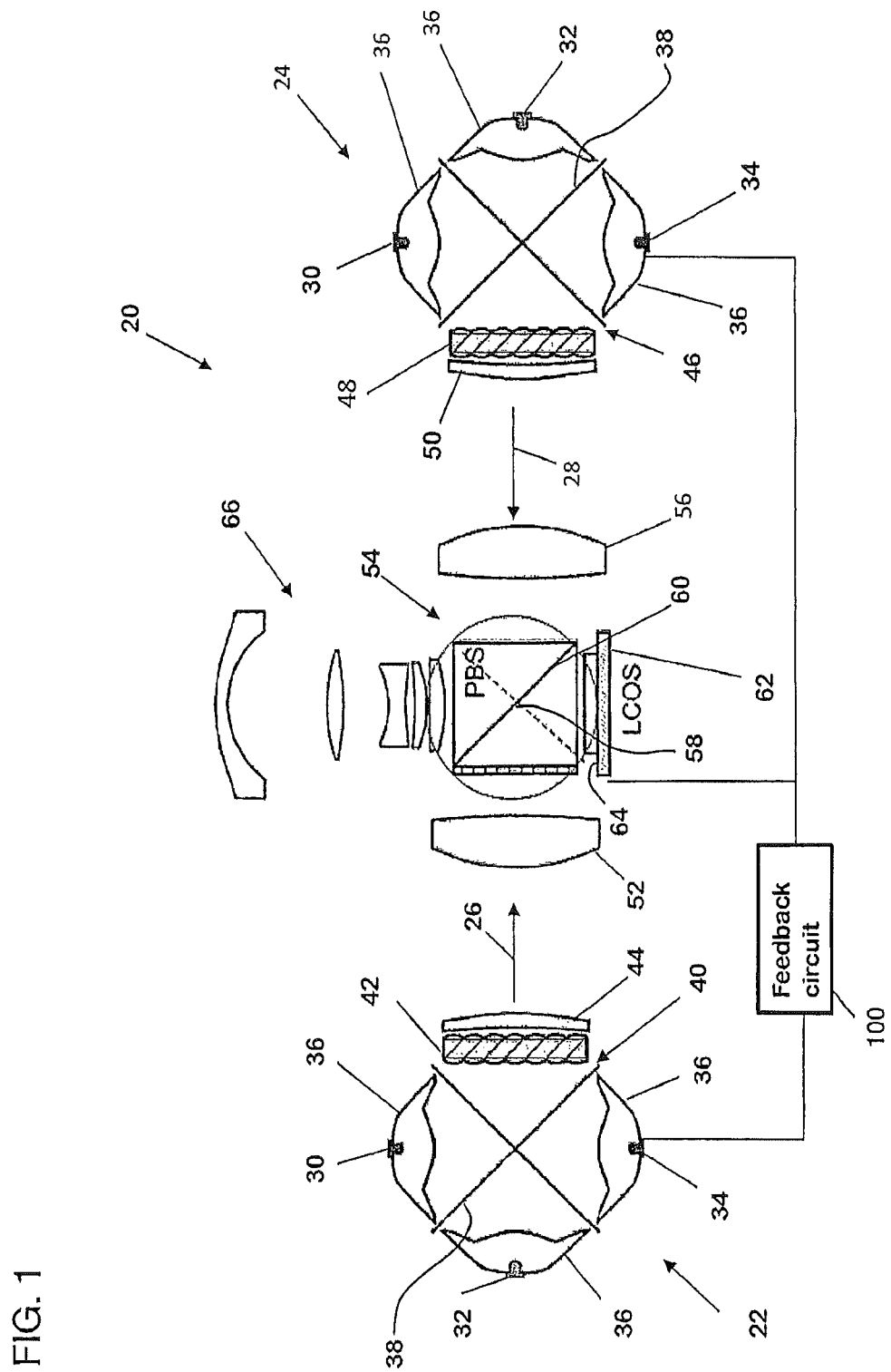
FIG. 1 is a schematic view of an exemplary three dimensional (3D) image projector in accordance with an embodiment of the invention.

With reference now to FIG. 1, an exemplary projector is shown for projecting a 3D image from a single projection lens. The projector 20 includes a first light source 22 and an opposing second light source 24. The light sources 22, 24 are arranged to direct light towards each other. Each light source includes three monochromatic LED's: a red LED 30, a green LED 32 and a blue LED 34. The LED's 30, 32, 34 are arranged to form three sides of a square and direct light toward the center of light source 22, 24. Each LED 30, 32, 34 may be coupled to direct light into a light collection optic 36.

The light collection optic 36 directs the light from the LED's 30, 32, 34 into a dichroic color combiner 38. The dichroic color combiner 38 combines light from the LED's to create a desired light color. The light from the first light source 22 exits via an open side 40 and passes through a fly's eye lens 42 and a pre-polarizer lens 44. The light exits the pre-polarization lens 44, in the direction of arrow 26, and passes through a focusing lens 52 that focuses the light into a polarizing beam splitter (PBS) 54. The second light source 24 operates in a similar manner such that the light emitted from the LEDs exits an open side 46 and passes through a fly's eye lens 48 and a pre-polarizer lens 50. After being conditioned by the fly's eye lens 48 and the pre-polarizer lens 50, the light travels in the direction shown by arrow 28, through a focusing lens 56 before entering the PBS 54.

A PBS 54 is an optical component that splits incident light rays into a first (transmitted) polarization component and a second (reflected) polarization component. In the exemplary embodiment, the PBS 54 is a device arranged to rotate about an axis 58. The PBS 54 has a surface 60 that alternately reflects the light from the light sources 22, 24 as it rotates onto an imaging device 62. In the embodiment shown in FIG. 1, the imaging device 62 includes a LCoS display. The light reflects off of the surface 64 of the imaging device 62 with a polarization that then substantially transmits through the PBS 54, through the projection lens assembly 66 and out of the projector 20.

The projector 20 shown in FIG. 1 also includes a feedback circuit 100 that is used to synchronize various components within the projector 20, particularly to stabilize polarization modulation. The feedback circuit 100 is electrically coupled to communicate with the first light source 22, the second light source 24, the PBS 54 and the imaging device 62. The feedback circuit 100 receives modulation signals from the PBS 54 and from the light sources 22, 24 or the imaging device 62, and then outputs a modulation signal to the PBS 54 to keep the PBS 54 synchronized with the light sources 22, 24 or with the imaging device 62 during operation. Alternatively, there may be two or more feedback circuits 100, one or more to keep the PBS 54 synchronized with the light sources 22, 24 and another to keep the PBS 54 synchronized with the imaging device 62. In other words, the feedback circuit 100 ensures that the PBS 54 is rotating at a speed such that the PBS 54 is in the correct position when either an image is displayed on the surface 64 of the imaging device 62 and/or a light is emitted by one of the light sources 22, 24.

Figure 2:
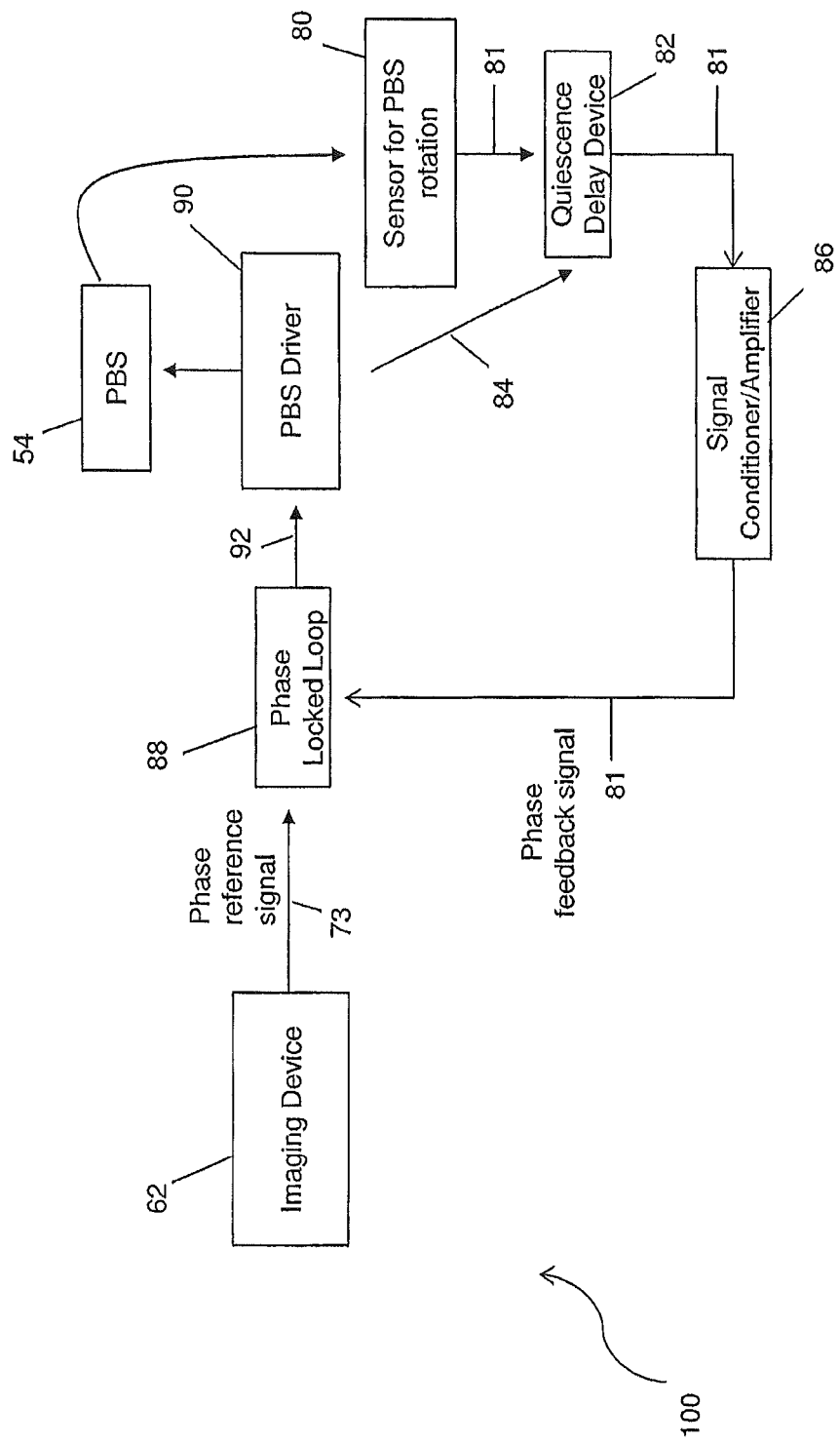
FIG. 2 is a flow chart for a method of operating a feedback circuit in a 3D image projector in accordance with an embodiment of the invention.

With reference to FIG. 2, an exemplary embodiment of a feedback circuit 100 is provided for use in a projector for projecting a 3D image, such as projector 20 is generally shown. As shown in FIG. 2, the frame rate of the imaging device 62 of FIG. 1 is being synchronized with the rotation speed of the PBS 54 of FIG. 1. As shown in FIG. 2, the first input device being synchronized is the imaging device 62. A phase reference signal 73 is derived from the speed or frame rate of the imaging device 62. The phase reference signal 73 is input to a phase locked loop (PLL) 88. In an embodiment, the whole phase reference signal 73 is input to the PLL 88. In another embodiment, a fraction of the phase reference signal is input to the PLL 88.

The second input device shown in FIG. 2 is PBS 54 of FIG. 1. While the frame rate of the imaging device 62 is input into the feedback circuit 100, input from the rotating PBS 54, is simultaneously gathered via a sensor 80. In the embodiment shown in FIG. 2, the sensor 80 for the PBS 54 is a tachometer that measures the rotational speed of the PBS 54. In alternate embodiments, the sensor 80 detects the modulation signal driving the imaging device 62. A phase feedback signal 81 that indicates the rotational speed of the PBS 54 is output from the sensor 80. The phase feedback signal 81 output from the sensor 80 is adjustable via a programmable quiescence delay device 82 which is set based, for example, on how fast the PBS 54 is spinning. The quiescence delay device 82 is an optional element of the feedback circuit 100 which may be required to compensate for a delay that is introduced due to the design or circuitry of the projector 20. When the quiescence delay device 82 is used, a PBS modulator driver 90 for the PBS 54 sends the quiescent delay device 82 a quiescence reference signal 84 that is based on the current rotational speed of the PBS 54 such that any delay in a phase feedback signal 81 may be eliminated to achieve synchronization accuracy. Additionally, an optional signal conditioner or amplifier 86 may be applied to the phase feedback signal 81 that is output from the quiescence delay device 82 prior to the phase feedback signal 81 being directed to the PLL 88.

The PLL 88 compares the phase reference signal 73 and the phase feedback signal 81 to determine whether the rotation of the PBS 54, is synchronized with the frame rate of the imaging device 62. Based on the results of the comparison, the PLL 88 outputs a signal 92 to the PBS modulator driver 90 causing the PBS modulator driver 90 to either increase or decrease the rotational speed of the PBS 54. This synchronization of the PBS 54 with the imaging device 62 stabilizes the polarization modulation occurring within the projector 20.

In another embodiment, the first input device is an LED, such as LED 30 within light source 22 of FIG. 1. In this embodiment the frame rate of the LED 30 is being synchronized with the rotation speed of the PBS 54. In this embodiment, it may be necessary, depending on the projector 20, to adjust the phase reference signal 73 before it is input to the PLL 88. For example, if the projector has two light sources, such as light sources 22 and 24 as shown in the projector of FIG. 1, modification of the phase reference signal 73 is not required because each light source only emits light when the rotating PBS 54 is in a given position. If the projector has only a single light source, however, the light source will emit light twice for every rotation of the PBS 54. The phase reference signal 73 must therefore be adjusted to correlate the emission of a light from an LED with the timing that a PBS 54 is in a given position. After any modification (e.g., by a reference signal modification block, not shown), the phase reference signal 73 is then directed into the PLL 88. Alternatively, the difference may be compensated for with a delay in the sensor 80.

Figure 3:
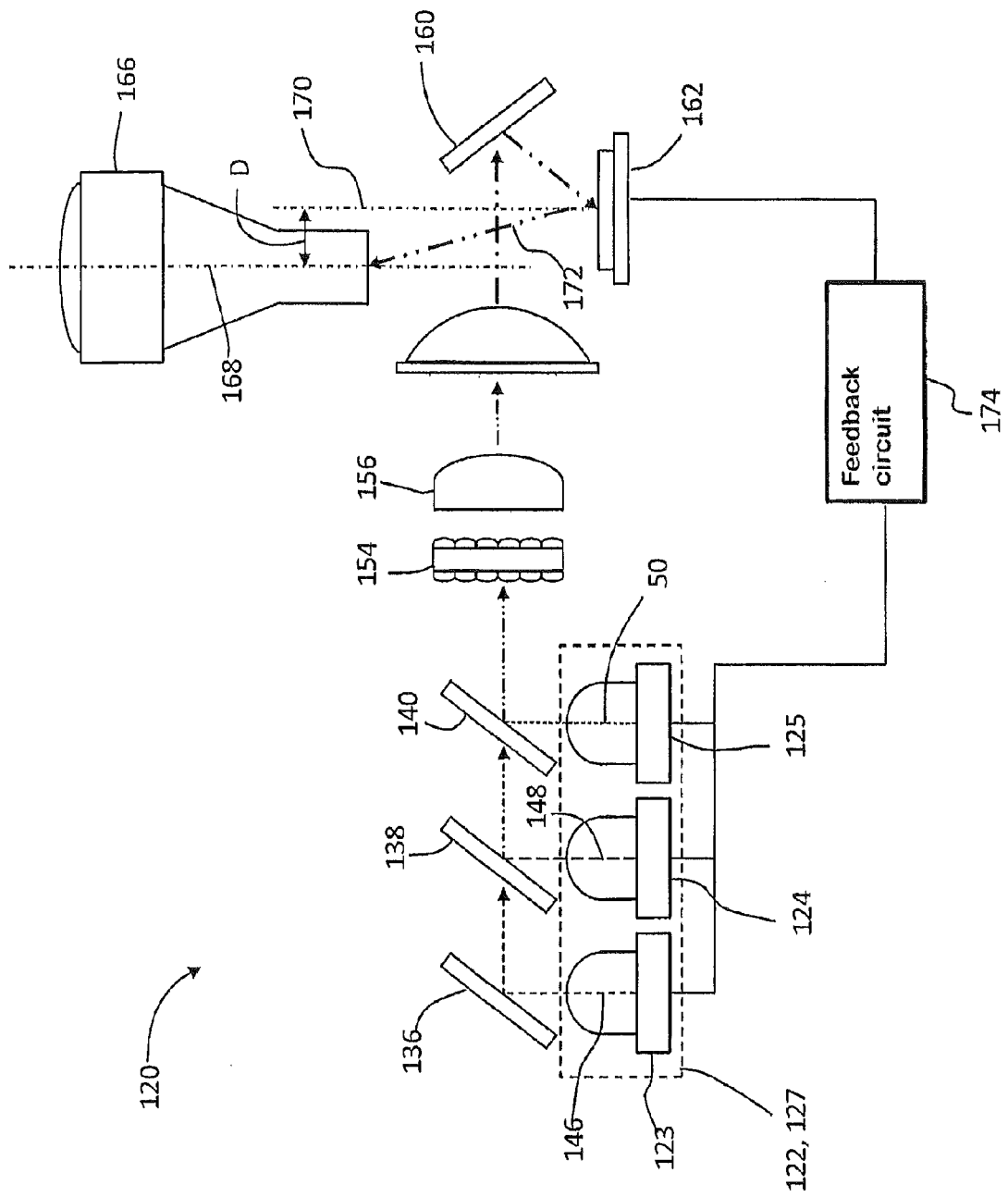
FIG. 3 is a schematic view of another exemplary 3D image projector in accordance with an embodiment of the invention.
Figure 4:
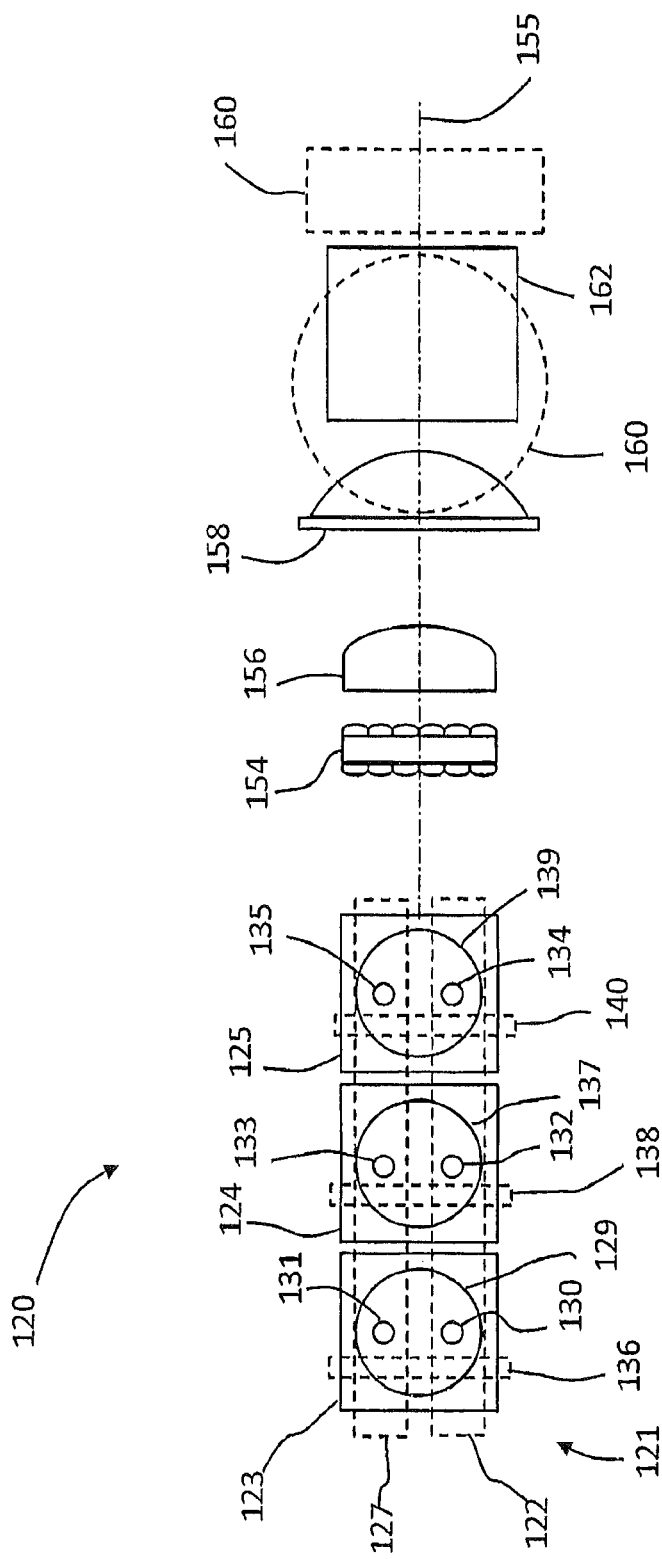
FIG. 4 is a top schematic view of the 3D image projector of FIG. 3.

With reference now to FIG. 3 and FIG. 4, a 3D projector 20 that includes a feedback circuit 174 is shown for projecting a 3D image from a single projection lens in accordance with an embodiment of the invention. The projector 120 includes a light generator 121 having three individual laser light generators 123, 124, 125. In the exemplary embodiment, each laser light generator 123, 124, 125 includes a pair of monochromatic laser diodes, with each of the pair of monochromatic laser diodes having orthogonal polarizations relative to each other. In the exemplary embodiment, the generator 123 includes a pair of red laser diodes 130, 131, the generator 124 includes a pair of green laser diodes 132, 133 and the third generator 125 a pair of blue laser diodes 134, 135.

The generators 123, 124, 125 are arranged in series. As a result, the diodes 130, 132, 134 are aligned in series to form a first light source 122 and the diodes 131, 133, 135 are aligned to form a second light source 127. Each of the diodes 130, 132, 134 may include an integrated collimator 129, 137, 139 that directs light toward one of adjacent dichroic minors 136, 138, 140. A dichroic mirror or filter uses alternating layers of optical coatings with different refractive indexes built up upon a glass substrate. The interfaces between the layers of different refractive index produce phased reflections, selectively reinforcing certain wavelengths of light and interfering with other wavelengths. Since unwanted wavelengths are reflected rather than absorbed, dichroic filters do not absorb this unwanted energy during operation which provides advantages in reducing heat when compared with an equivalent light filtering device since the filter will absorb energy all from all wavelengths except the desired color.

The minors 136, 138, 140 are each arranged to reflect the color of their respective laser diode 130, 132, 134. Further, the minors 136, 138, 140 are disposed on an angle to reflect and blend the individual colors to form white light. In the exemplary embodiment shown in FIG. 3, the first laser diode 130 emits a blue colored light 146 that reflects off of the dichroic mirror 136 towards the dichroic minor 138. Simultaneously, the second laser diode 132 emits a green colored light 148 that reflects off of the dichroic minor 138 towards the dichroic minor 140. The light 146 from the first laser diode 130 mixes with the light 148 from the second laser diode 132.

Simultaneously with the emitting of light 146, 148, the third laser diode 134 emits a red colored light 150 towards dichroic mirror 140. The dichroic minor 140 reflects the light 150 and allows mixing with the light from diodes 130, 132 to form white light. The dichroic mirrors 136, 138, 140 are angled or shaped to direct the white light in a direction towards a common optic axis 155. Each of the light sources 122, 127 are configured with a predetermined polarization. In one embodiment, the polarization of light source 142 is orthogonal to the polarization of light source 144. Further, the light sources 142, 144 are configured to alternately and sequentially emit light onto the common optic axis 155.

The light from the first light source 122 exits and passes through a fly's eye lens 154. The fly's eye lens 154 is made up of an array of lenslets that have the effect of breaking the transmitted light into many components and projecting them evenly over the field of view. The result is even, bright illumination without any reduction in light intensity at the periphery of the projected light. Once the light leaves the fly's eye lens 154, the light may pass through an optional condenser lens 156 that concentrates the light.

Next, the light passes through a focusing lens 158 that focuses the light toward a mirror 160. The minor 160 reflects and spreads the light onto an imaging device 162. The light reflects off of the imaging device 162 with a polarization that then substantially transmits through a projection lens assembly 166 and out of the projector 120. This process is repeated in a sequential manner for the second light source.

In an exemplary embodiment, the imaging device 162 is a DMD. A DMD is an optical semiconductor having several hundred thousand microscopic minors arranged in an array. The array of microscopic minors forms an image surface or plane that may then be projected. These surface mirrors correspond to pixels in the image being displayed. The minors are individually rotated to either reflect the light into the projection lens assembly 166 or reflect the light away (making it dark). Grey scale colors are produced by toggling the microscopic minors very quickly. The amount of time the microscopic mirrors are reflecting into projection lens assembly 166 will determine the shade of grey.

As shown in FIG. 3 and FIG. 4, the imaging device 162 is arranged with a first axis 170 that extends is substantially perpendicular from the center of the image surface of the DMD image device 162. The projection lens assembly 166 is arranged on a second axis 168. The first axis 170 and the second axis 168 are offset by a distance D such that mirror 160 is arranged to reflect the light such that light 172 being reflected off of the imaging device 162 is at an angle that causes the light to intercept the projection lens assembly 166. In one embodiment, the projector 120 includes an optional back reflection filter to reduce speckle.

The projector 120 also includes a feedback circuit 174. The feedback circuit 174 is electrically coupled to communicate with the first light source 122, the second light source 127 and the DMD imaging device 162. The feedback circuit 174 receives a modulation signal from the light sources 122, 127 and from the DMD imaging device 162, and provides a modulation signal to the DMD imaging device 162. The modulation signals keep the light sources 122, 127 and the DMD imaging device 162 synchronized during operation. In other words, the feedback circuit 174 ensures that the desired light source 122, 127 is emitting light that corresponds to the image projected through the projection lens assembly 166.

Figure 5:
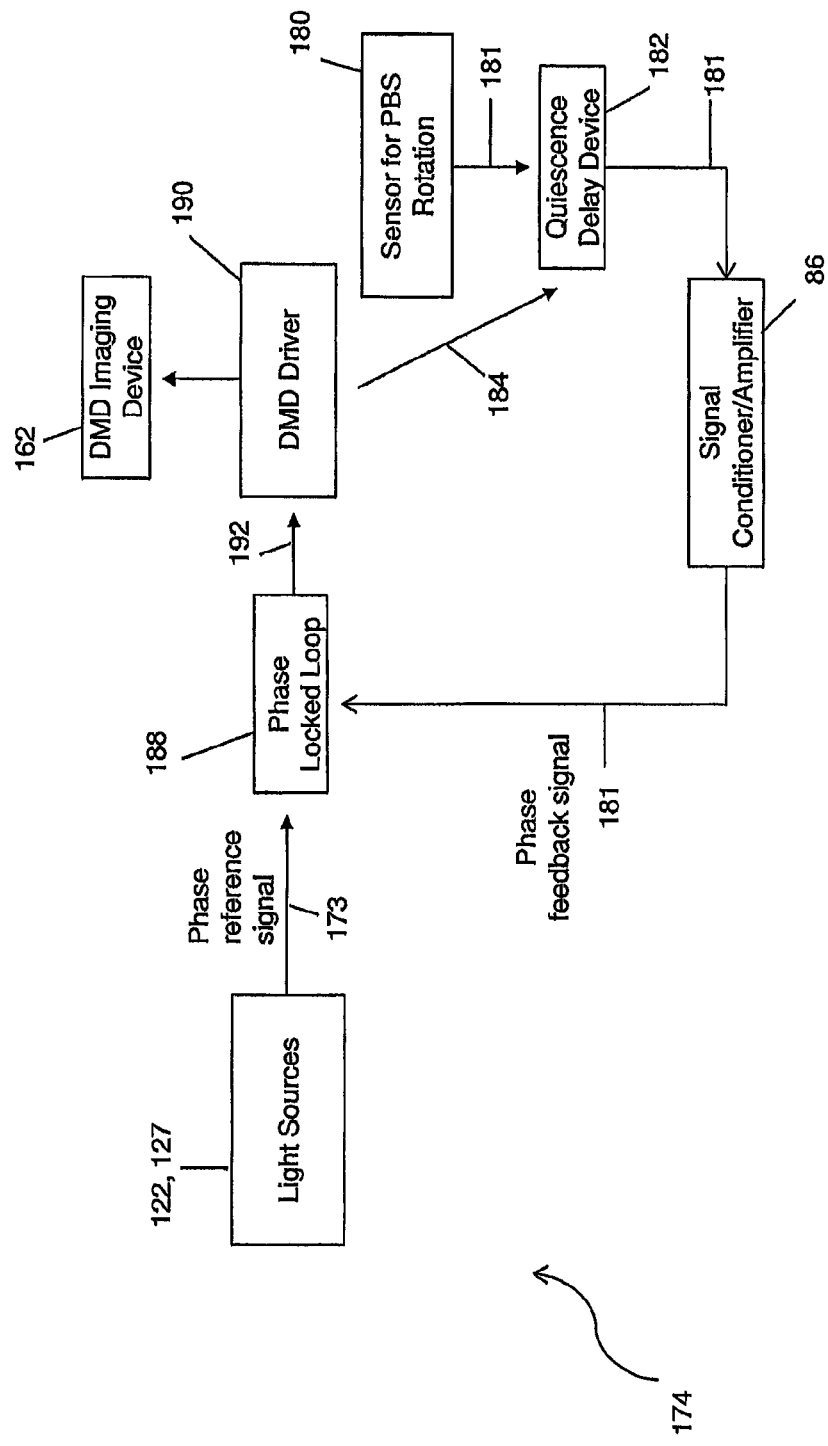
FIG. 5 is a flow chart for a method of operating a feedback circuit in a 3D image projector in accordance with another embodiment of the invention.

With reference to FIG. 5, an exemplary embodiment of a feedback circuit 174 is provided for use in a projector for projecting a 3D image, such as projector 120 is generally shown. As shown in FIG. 5, the modulation rate (i.e., the on/off flashing rate) of the light sources 122, 127 of FIG. 3 and FIG. 4 are being synchronized with the rotation speed of the mirrors in the DMD imaging device 162. Thus, the first input device being synchronized includes light sources 122, 127 and the second input device is the DMD imaging device 162. A phase reference signal 173 is derived from the modulation rate of the light sources 122, 127, and the phase reference signal 173 is input to a PLL 188. While the modulation rate of the light sources 122, 127 is input into the feedback circuit 174, input from the DMD imaging device 162, is simultaneously gathered via a sensor 180. In the embodiment shown in FIG. 5, the sensor 180 measures the rotational speed of the mirrors in the DMD imaging device 162. In alternate embodiments, the sensor 180 detects the modulation signal driving the rotational speed of the mirrors in the DMD imaging device 162.

A phase feedback signal 181 that indicates the rotational speed of the minor in the DMD imaging device 162 is output from the sensor 180. The phase feedback signal 181 output from the sensor 180 is adjustable via a programmable quiescence delay device 182 which is set based, for example, on how fast the mirrors in the DMD imaging device 162 are spinning. The quiescence delay device 182 is an optional element of the feedback circuit 174 which may be required to compensate for a delay that is introduced due to the design or circuitry of the projector 120. When the quiescence delay device 182 is used, a DMD driver 190 that controls the rotational speed of the mirrors in the DMD imaging device 162 sends the quiescent delay device 182 a quiescence reference signal 184 that is based on the current rotational speed of the minors in the DMD imaging device 162 such that any delay in the phase feedback signal 181 may be eliminated to achieve synchronization accuracy. Additionally, an optional signal conditioner or amplifier 186 may be applied to the phase feedback signal 181 that is output from the quiescence delay device 182 prior to the phase feedback signal 181 being directed to the PLL 188.

The PLL 188 compares the phase reference signal 173 and the phase feedback signal 181 to determine whether the rotation of the minors in the DMD imaging device 162 are synchronized with the modulation rate of the light sources 122, 127. Based on the results of the comparison, the PLL 188 outputs a signal 192 to the DMD driver 190 causing the DMD driver 190 to either increase or decrease the rotational speed of the mirrors in the DMD imaging device 162.

Embodiments of the present invention provide for a feedback circuit compatible with a 3D projector in a number of arrangements. The description of the exemplary projector systems is meant to aid in the understanding of the application of the feedback circuit to a projector system, and not to limit the invention. The present invention provides the advantage of having synchronized components within a projector for ensuring the accuracy of a projected 3D image. Embodiments of the present invention provide advantages in emitting a 3D image usable with passive or active glasses.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A projector system for a portable electronic device, the projector system comprising:
   an input device;
   a digital mirror device (DMD), the DMD having a plurality of rotating minors;
   a sensor operably coupled to measure a rotational speed of the plurality of rotating mirrors;
   a control device configured for controlling the rotational speed of the plurality of rotating mirrors;
   a phase locked loop (PLL) electrically coupled to the sensor; and
   wherein the phase locked loop is configured for receiving a phase reference signal from the first input device, for receiving the phase feedback signal from the sensor, for comparing the phase reference signal and the phase feedback signal to determine whether the input device and the DMD are synchronized, and for sending a first signal to the control device to change the rotational speed of the plurality of minors in response to determining that the input device and DMD are not synchronized.

2. The projector system of claim 1 further comprising a quiescence delay device electrically coupled between the sensor and the PLL, the quiescence delay device configured to delay the transmission of a phase feedback signal.

3. The projector system of claim 2 wherein the input device is a light source.

4. The projector system of claim 3 wherein the light source includes three laser light generators.

5. The projector system of claim 4 wherein each of the three laser light generators includes a pair of monochromatic laser diodes.

6. The projector system of claim 5 wherein each of the pair of monochromatic laser diodes have orthogonal polarizations relative to each other.

7. The projector system of claim 6 wherein the three laser light generators includes a first laser generator having a pair of red laser diodes, a second laser generator having a pair of green laser diodes, and a third laser light generator having a pair of blue laser diodes.

8. The projector system of claim 4 further comprising three dichroic minors arranged to reflect and direct light from the three laser light generators toward the DMD.

9. The projector system of claim 8 wherein the three dichroic mirrors cooperate to blend the light from the three laser light generators to form white light.

10. The projector system of claim 9 further comprising a mirror adjacent the DMD and arranged to reflect light from the three dichroic mirrors onto the DMD.

11. A projector system for a portable electronic device, the projector system comprising:
    a first input device;
    a second input device;
    a polarizing beam splitter (PBS), the PBS configured to rotate about a first axis;
    a sensor operably coupled to measure a rotational speed of the PBS;
    a control device configured for controlling a rotational speed of the plurality of minors;
    a phase locked loop (PLL) electrically coupled to the sensor; and
    wherein the phase locked loop is configured for receiving a phase reference signal from the first input device, for receiving the phase feedback signal from the sensor, for comparing the phase reference signal and the phase feedback signal to determine whether the first input device and the second input device are synchronized, and for sending a first signal to the control device to change the rotational speed of the PBS in response to determining that the first input device and second input device are not synchronized.

12. The projector system of claim 11 further comprising a quiescence delay device electrically coupled between the sensor and the PLL, the quiescence delay device configured to delay the transmission of a phase feedback signal.

13. The projector system of claim 12 wherein the first input device is a light source and the second input device is an image generating device, the image generating device arranged to receive light reflected from the PBS.

14. The projector system of claim 13 wherein the PLL is further configured to generate a second signal in response to determining that the light source and the PBS are not synchronized, and the quiescence delay device changes a delay period of the phase feedback signal in response to receiving the second signal.

15. The projector system of claim 14 wherein the light source comprises:
a first light source emitting a first light along an optical axis;
a second light source emitting a second light along the optical axis in a direction substantially opposite the first light source; and
the PBS being disposed between the first light source and the second light source.

16. The projector of claim 15 wherein the first light source and the second light source each include three monochromatic light emitting diodes (LED's).

17. The projector of claim 16 wherein the three monochromatic LED's include a red LED, a green LED and a blue LED.

18. The projector of claim 17 wherein first light source and second light source each include a dichroic color combiner, the dichroic color combiner arranged to reflect light toward the PBS.

19. The projector of claim 18 further comprising a first pre-polarizer lens disposed between the first light source and the PBS, and a second pre-polarizer lens disposed between the second light source and the PBS.

20. The projector of claim 19 wherein the image generating device is an LCoS display.

* * * * *